(12) United States Patent
Son et al.

(10) Patent No.: US 12,728,783 B2
(45) Date of Patent: Sep. 8, 2026

(54) HEADREST HAVING A SPEAKER

(71) Applicants: HYUNDAI MOTOR COMPANY, Seoul (KR); KIA CORPORATION, Seoul (KR); HYUNDAI TRANSYS INC., Seosan-si (KR)

(72) Inventors: Byeong Seon Son, Seoul (KR); Tae Hoon Lee, Suwon-si (KR); Young Sun Choi, Suwon-si (KR); Ji Hwan Kim, Seoul (KR); Seon Chae Na, Yongin-si (KR); Sang Ho Kim, Incheon (KR); Sang Hoon Park, Incheon (KR); Jae Ho Song, Seoul (KR); Won Kee Kim, Suwon-si (KR)

(73) Assignees: HYUNDAI MOTOR COMPANY, Seoul (KR); KIA CORPORATION, Seoul (KR); HYUNDAI TRANSYS INC., Seosan-si (KR)

( * ) Notice: Subject to any disclaimer, the term of this patent is extended or adjusted under 35 U.S.C. 154(b) by 118 days.

(21) Appl. No.: 18/798,259

(22) Filed: Aug. 8, 2024

(65) Prior Publication Data

US 2024/0391371 A1 Nov. 28, 2024

Related U.S. Application Data

(62) Division of application No. 17/950,855, filed on Sep. 22, 2022, now Pat. No. 12,122,278.

(30) Foreign Application Priority Data

Dec. 16, 2021 (KR) ........................ 10-2021-0180802

(51) Int. Cl.
*B60N 2/879* (2018.01)

(52) U.S. Cl.
CPC .................................... *B60N 2/879* (2018.02)

(58) Field of Classification Search
CPC ......... B60N 2/829; B60N 2/853; B60N 2/879
See application file for complete search history.

(56) References Cited

U.S. PATENT DOCUMENTS 9,327,628 B2 * 5/2016 Subat .................... B60N 2/879
9,802,519 B2 10/2017 Subat et al.
(Continued)

FOREIGN PATENT DOCUMENTS

JP 2009247388 A 10/2009
JP 2016011005 A 1/2016
(Continued)

*Primary Examiner* — Philip F Gabler
(74) *Attorney, Agent, or Firm* — Lempia Summerfield Katz LLC

(57) ABSTRACT

Disclosed is a headrest having a speaker, the headrest including: a headrest frame having a rear surface to which a driving module is coupled so that the headrest frame is movable forwards, rearwards, or vertically in response to operation of the driving module, the headrest frame having a front surface formed with a speaker mounting space recessed rearwards; a speaker, inserted and fastened into the speaker mounting space in the headrest frame, provided with an output portion facing forwards and configured to output sound; a foam pad mounted on the front surface of the headrest frame so as to cover both the headrest frame and the speaker; a covering configured to cover a front surface of the foam pad and forming a front exterior of the headrest; and a headrest stay configured to connect the headrest frame to a seat.

12 Claims, 8 Drawing Sheets

(56) References Cited

U.S. PATENT DOCUMENTS

| | | | | |
|---|---|---|---|---|
| 10,239,432 | B2 | 3/2019 | Subat et al. | |
| 10,562,426 | B2 * | 2/2020 | Scott | B60N 2/829 |
| 10,569,685 | B2 * | 2/2020 | Kakishima | B60N 2/897 |
| 10,721,554 | B2 * | 7/2020 | Groleau | B60N 2/879 |
| 10,730,423 | B2 | 8/2020 | Subat et al. | |
| 11,180,063 | B2 | 11/2021 | Brown | |
| 2017/0210263 | A1 | 7/2017 | Line et al. | |
| 2017/0251287 | A1 * | 8/2017 | Oswald | H04R 1/025 |
| 2019/0118688 | A1 | 4/2019 | Fujikake et al. | |
| 2019/0168649 | A1 | 6/2019 | Watson | |
| 2020/0021900 | A1 | 1/2020 | Stottan et al. | |
| 2020/0055434 | A1 | 2/2020 | Hunt | |

FOREIGN PATENT DOCUMENTS

| | | | |
|---|---|---|---|
| KR | 0130391 | Y1 | 2/1999 |
| KR | 20170035535 | A | 3/2017 |

* cited by examiner

HEADREST HAVING A SPEAKER

CROSS-REFERENCE TO RELATED APPLICATIONS

This application is a divisional of U.S. patent application Ser. No. 17/950,855 filed Sep. 22, 2022 and entitled "Headrest Having A Speaker," and which claims priority to and the benefit of Korean Patent Application No. 10-2021-0180802, filed on Dec. 16, 2021, in the Korean Intellectual Property Office, the entire disclosure of which is incorporated herein by reference.

BACKGROUND

1. Field of the Disclosure

The present disclosure relates to a headrest having a speaker, and to technology for preventing the speaker from being exposed to the outside by mounting the speaker inside the headrest.

2. Description of the Related Art

In the related art, vehicles are equipped with radios and playback devices for the purpose of entertaining passengers and changing the mood. Generally, a large number of speakers for radios and playback devices are installed in the front and rear of a vehicle so that both front and rear-seat passengers may easily hear the sound from the speakers.

However, there are passengers who may not want to listen to the sound depending on their taste or mood. However, since a large number of speakers are installed in the front and rear of the vehicle, even passengers who do not want to listen are forced to, causing them discomfort.

In order to solve this problem, in the related art, a speaker is mounted on a headrest of a front-row seat, but there is a problem in that since the speaker protrudes outside the headrest, the speaker may impact the driver's head in the event of a traffic accident, resulting in injury.

SUMMARY

Therefore, the present disclosure has been made in view of the above problems, and it is an object of the present disclosure to provide a headrest having a speaker in which the speaker is embedded in a headrest frame and is enclosed by a foam pad and a slab pad. In this way, the volume of space occupied by the speaker is minimized because the structure in which the speaker in embedded does not protrude outside the headrest.

In accordance with an aspect of the present disclosure, the above and other objects can be accomplished by the provision of a headrest having a speaker, the headrest including a headrest frame having a rear surface to which a driving module is coupled so that the headrest frame is capable of being moved forwards, rearwards, or vertically in response to the operation of the driving module, the headrest frame having a front surface formed with a mounting space recessed rearwards. The headrest also includes a speaker, inserted and fastened into the mounting space in the headrest frame, provided with an output portion facing forwards and configured to output sound, the speaker having a rear side closed by the headrest frame. The headrest also includes a foam pad mounted on the front surface of the headrest frame so as to cover both the headrest frame and the speaker, the foam pad having formed therein a first through hole configured to output sound forwards at a position corresponding to the output portion. The headrest also includes a covering configured to cover a front surface of the foam pad and forming a front exterior of the headrest.

The foam pad may have a front side formed with an indent indented inwards, and the headrest may further include a slab pad seated in the indent of the foam pad so as to be coupled to the foam pad, the slab pad having formed therein a plurality of second through holes arranged radially at a position corresponding to the first through hole, wherein each second through hole has a smaller diameter than the first through hole.

The covering may have a front side formed with cover holes, each having a smaller diameter than the second through holes and arranged in a predetermined pattern including a gradation pattern or a radial pattern.

The mounting space may be recessed further rearwards than the speaker so as to serve as a sound box of the speaker.

The headrest may further include a sound absorption pad acting as a shield between the speaker and the headrest frame so as to prevent sound leakage.

The output portion of the speaker may be provided as a pair of output portions spaced apart in the leftward-and-rightward direction in the headrest frame, and the first through hole may be provided as a pair of first through holes so as to correspond to the pair of output portions.

The pair of output portions provided to be spaced apart in the leftward-and-rightward direction may be integrated in the speaker, and the speaker may be mounted in the headrest frame in a form extending in vertical and horizontal directions.

The speaker may be provided with a speaker connector penetrating the headrest frame and extending rearwards so as to allow electrical signals and power to be applied thereto.

The speaker may be mounted in a lower portion of the headrest frame and may have the output portion positioned in a lower front portion of the headrest frame.

The headrest may further include a headrest stay configured to connect the headrest frame to a seat, and the driving module may interconnect the headrest frame with the headrest stay so as to move the headrest forwards, rearwards, or vertically.

The headrest may further include a headrest connector having a terminal that is coupled into the headrest connector and is connected to an electric wire inserted into the headrest stay, such that the electric wire is coupled to an end of the headrest stay via the terminal so as to be connectable from outside the headrest stay.

The headrest may further include a headrest cover coupled to the rear surface of the headrest frame so as to enclose the driving module and configured to block rearward output of sound from the speaker.

BRIEF DESCRIPTION OF THE DRAWINGS

The above and other objects, features, and other advantages of the present disclosure are more clearly understood from the following detailed description taken in conjunction with the accompanying drawings, in which.

DETAILED DESCRIPTION

Figure 1:
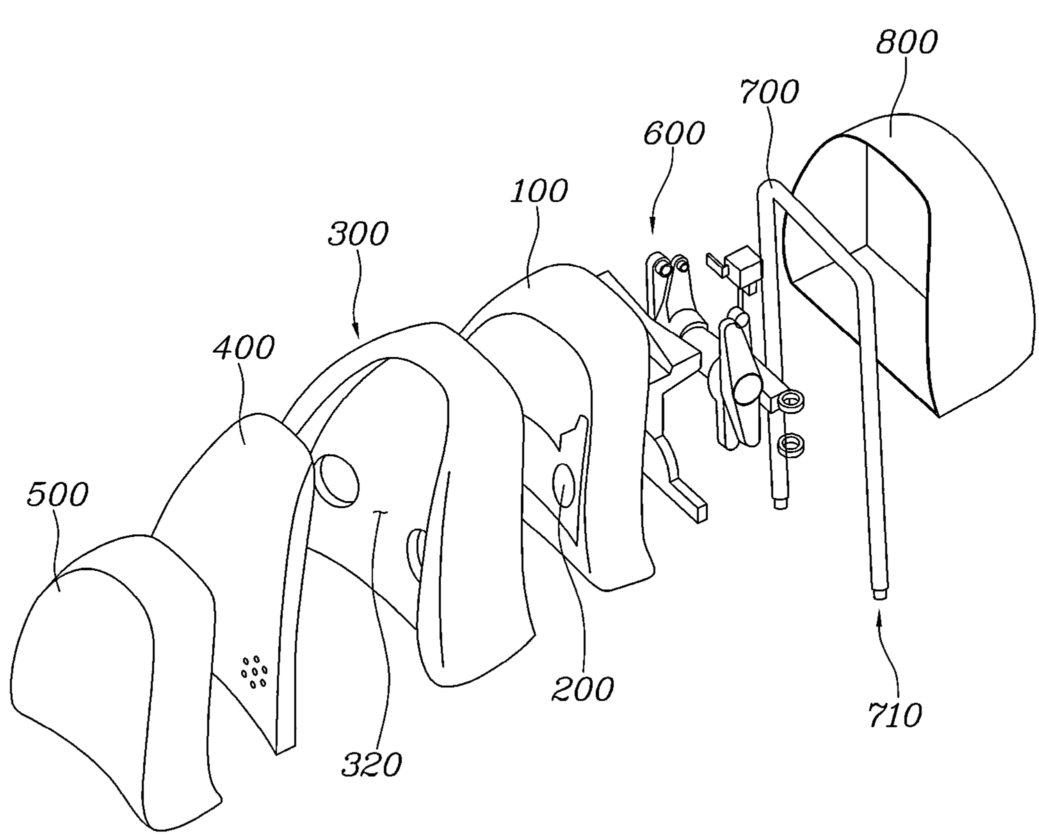
FIG. 1 is an exploded perspective view of a headrest having a speaker according to an embodiment of the present disclosure.

Reference is made in detail below to the embodiments of the present disclosure, examples of which are illustrated in the accompanying drawings. Wherever possible, the same reference numbers are used throughout the drawings to refer to the same or like parts.

Various embodiments are described below more fully with reference to the accompanying drawings, which show only some embodiments. Specific structural and functional details disclosed herein are merely representative for the purpose of describing example embodiments. The present disclosure, however, may be embodied in many alternative forms, and should not be construed as being limited to the embodiments set forth herein.

Accordingly, while embodiments of the disclosure are capable of being variously modified and taking alternative forms, embodiments thereof are shown by way of example in the drawings, and are described herein in detail. It should be understood, however, that there is no intent to limit the present disclosure to the particular embodiments disclosed herein. On the contrary, embodiments are to cover all modifications, equivalents, and alternatives falling within the scope of the disclosure.

It is understood that, although the terms “first”, “second”, and the like may be used herein to describe various elements, these elements should not be limited by these terms. These terms are only used to distinguish one element from another. For example, a first element could be termed a second element, and similarly, a second element could be termed a first element, without departing from the scope of embodiments of the present disclosure.

It is understood that when an element is referred to as being “connected to” another element, the element can be directly connected to the other element, or intervening elements may also be present. In contrast, when an element is referred to as being “directly connected to” another element, there are no intervening elements present. Other words used to describe the relationship between elements should be interpreted in a like fashion (e.g. “between” versus “directly between”, “adjacent” versus “directly adjacent”, and the like).

The terminology used herein is for the purpose of describing particular embodiments only and is not intended to be limiting of embodiments of the disclosure. As used herein, the singular forms “a”, “an”, and “the” are intended to include the plural forms as well, unless the context clearly indicates otherwise. It is further understood that the terms “comprises”, “comprising”, “includes”, and/or “including”, when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms used herein, including technical or scientific terms, have the same meanings as those generally appreciated by those having ordinary skill in the art. Terms defined in common dictionaries should be interpreted as having the same meanings as terms in the context of the pertinent technology, and should not be interpreted as having ideal or excessively formal meanings unless clearly defined in the specification.

When a component, device, element, or the like of the present disclosure is described as having a purpose or performing an operation, function, or the like, the component, device, or element should be considered herein as being “configured to” meet that purpose or to perform that operation or function.

A description is given in detail below of embodiments disclosed herein with reference to the accompanying drawings. Like reference numerals in each drawing indicate like members.

Conventionally, development has been undertaken to combine a speaker 200 with a headrest in order to block undesired transmission of sound to rear-seat passengers and to improve driving safety.

However, a conventional headrest frame 100 may be coupled with a driving module 600 configured to move a headrest stay 700 forwards, rearwards, or vertically in the headrest stay 700, which connects the headrest to a seat, and the speaker 200 is coupled to the headrest so as to protrude out of the headrest. Because of this structure, the speaker 200 and the passenger’s head may collide with each other when an accident occurs, raising concern about the safety of the passenger.

The present disclosure has been devised to solve this problem.

Figure 2:
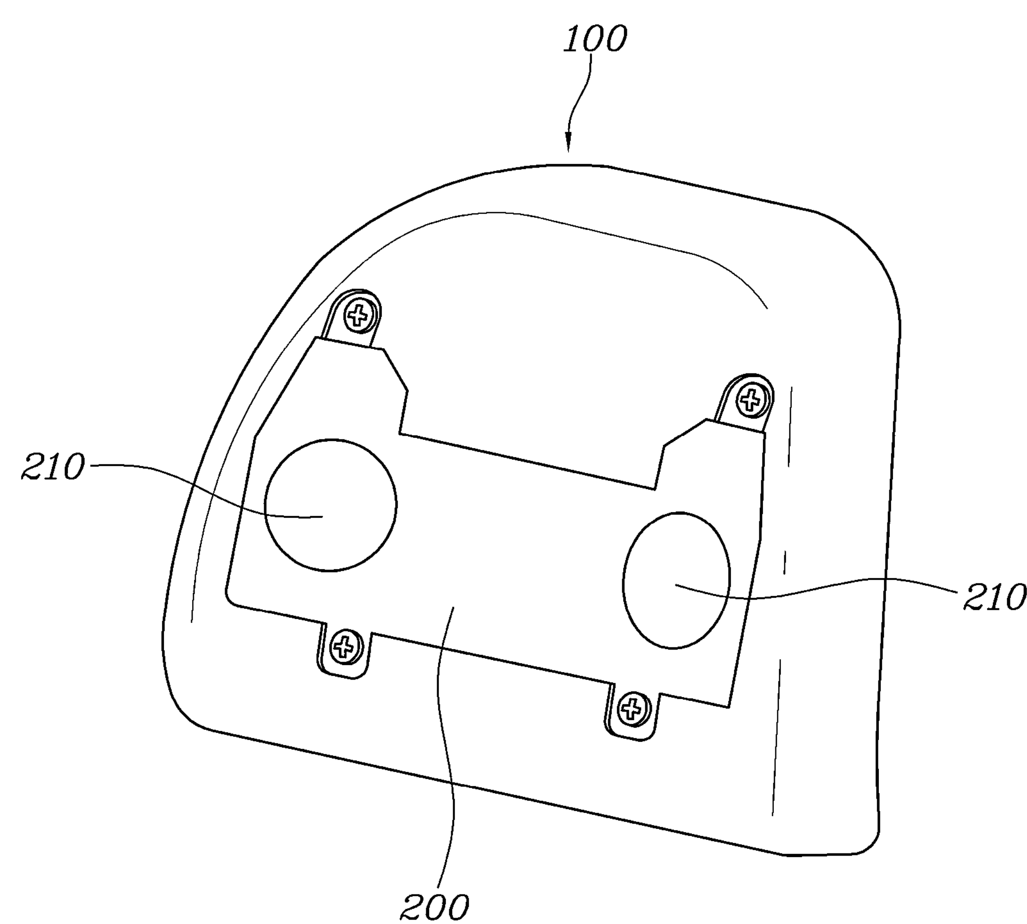
FIG. 2 is a perspective view of a headrest having a speaker according to an embodiment of the present disclosure illustrating the speaker mounted in a headrest frame.
Figure 3:
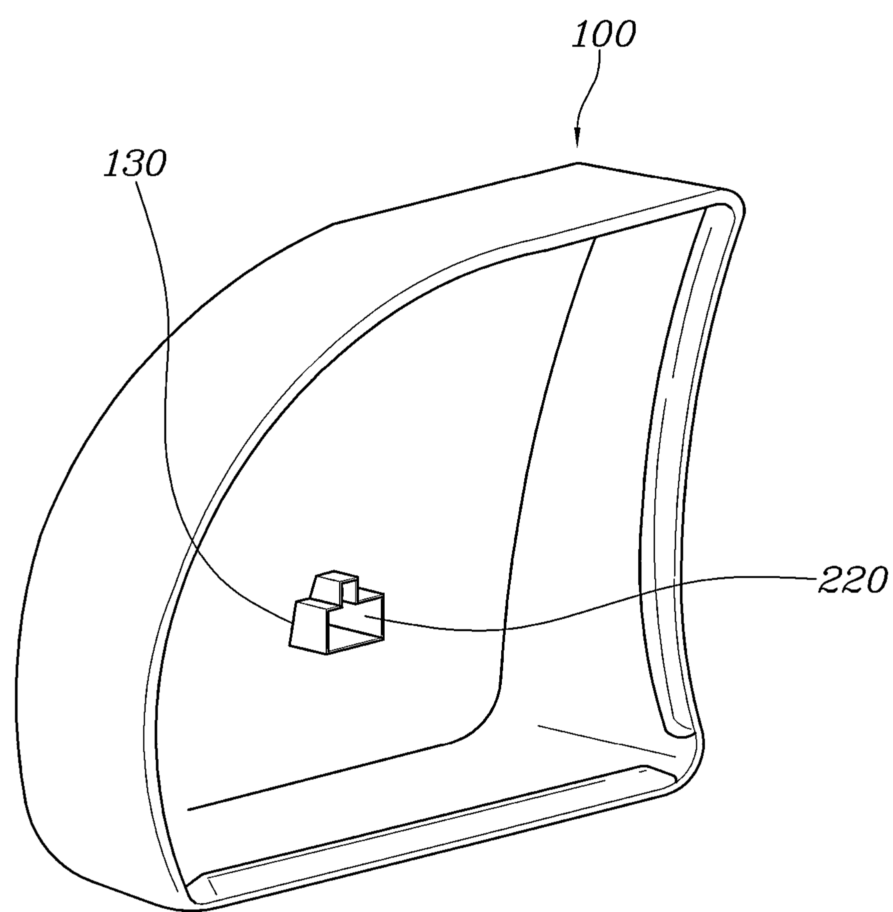
FIG. 3 is a rear view of FIG. 2.
Figure 4:
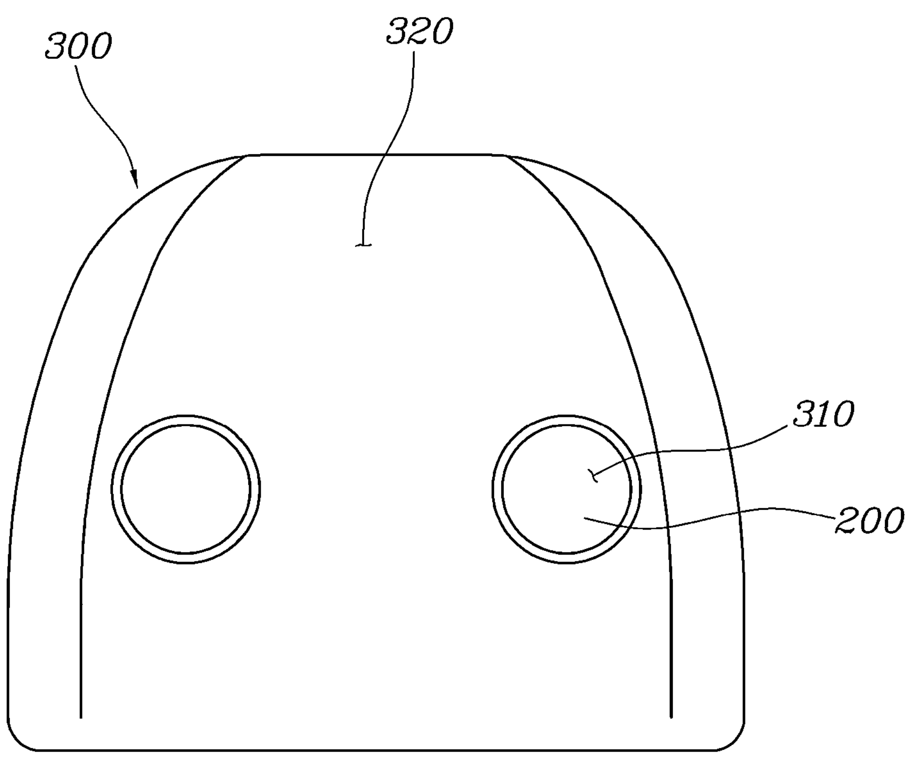
FIG. 4 is a front view of a foam pad mounted to a headrest frame of a headrest having a speaker according to an embodiment of the present disclosure.
Figure 5:
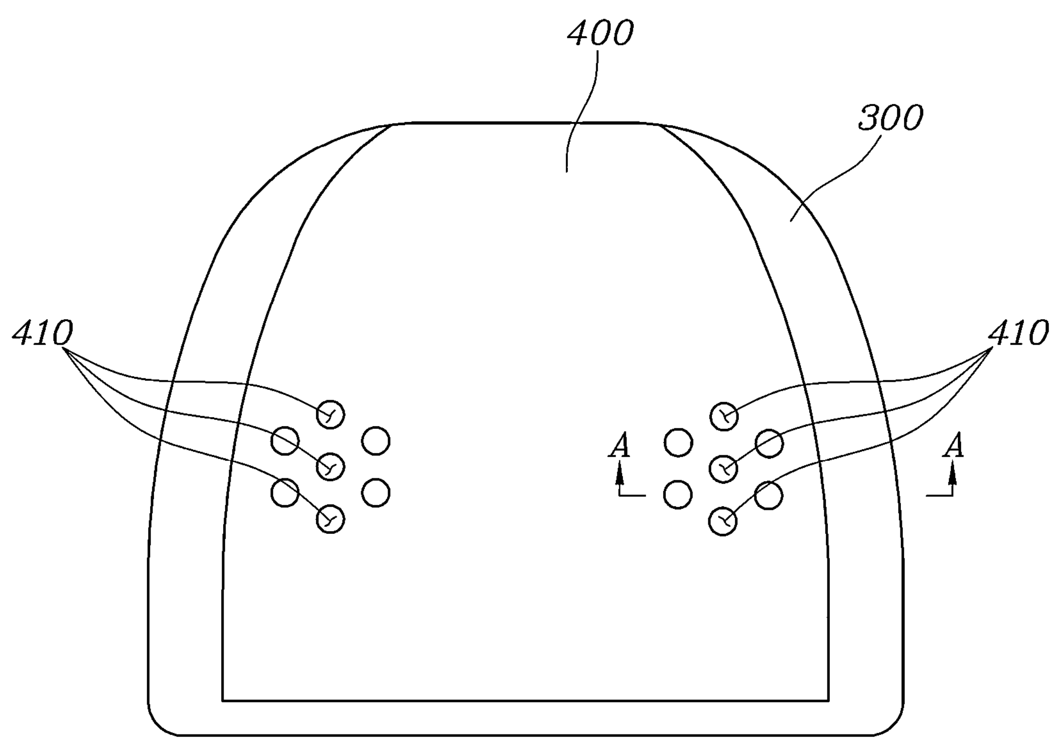
FIG. 5 is a front view of a slab pad mounted to a foam pad of a headrest having a speaker according to an embodiment of the present disclosure.
Figure 6:
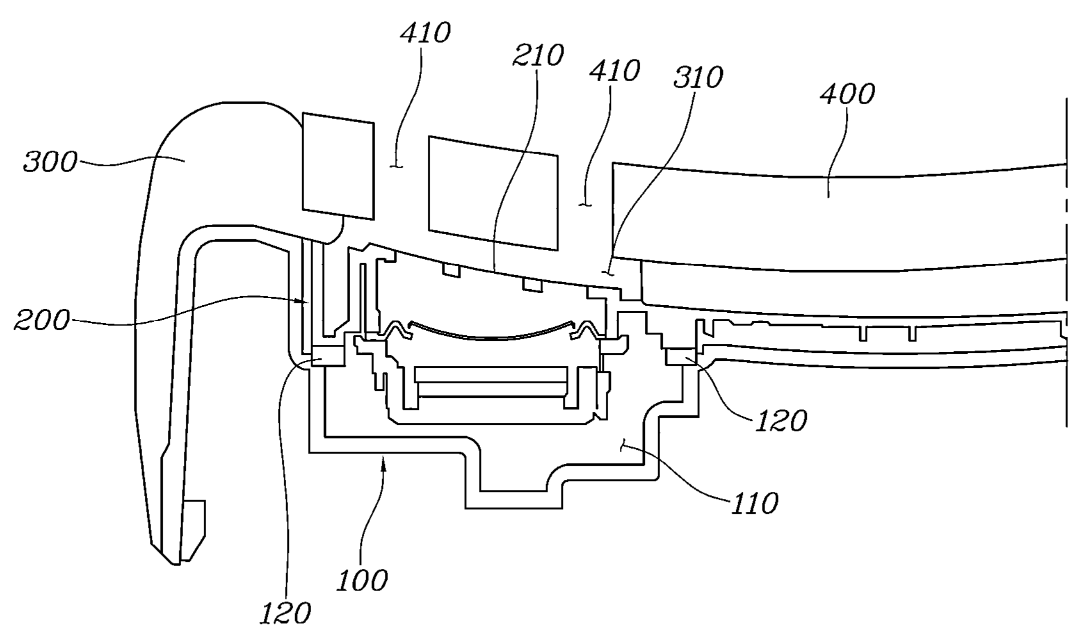
FIG. 6 is a sectional view taken along line A-A of FIG. 5.
Figure 7:
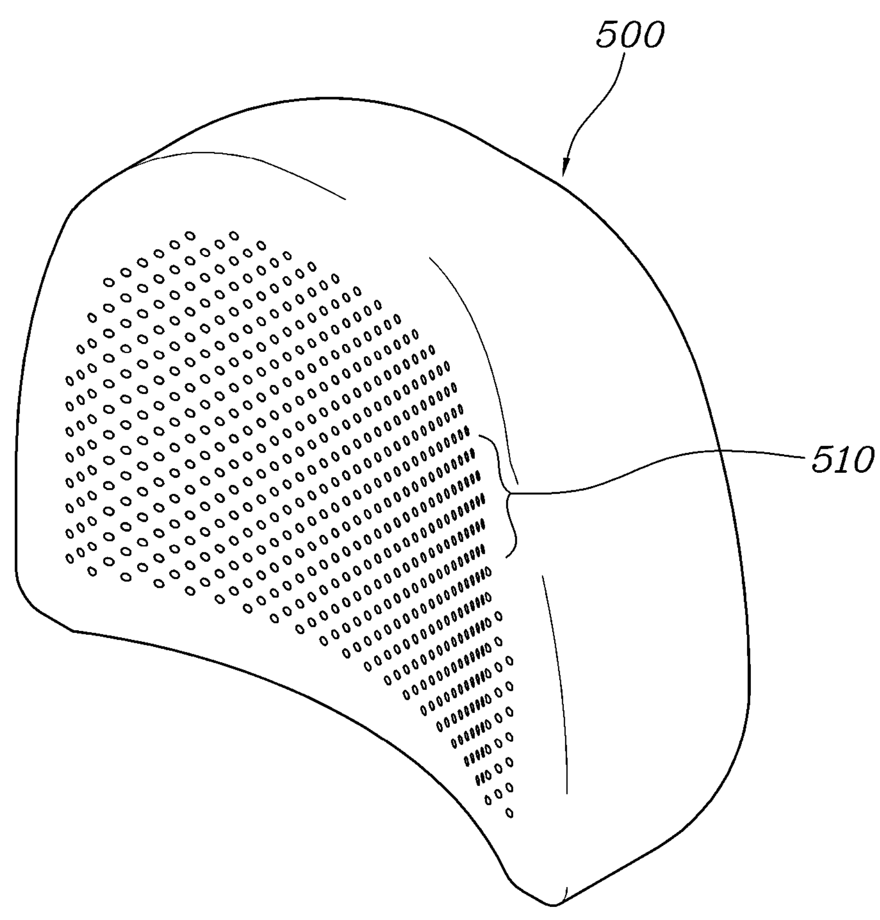
FIG. 7 is a view illustrating a covering of a headrest having a speaker according to an embodiment of the present disclosure.

FIG. 1 is an exploded perspective view of a headrest having a speaker 200 according to an embodiment of the present disclosure. FIG. 2 is a perspective view of the headrest having the speaker 200 according to an embodiment of the present disclosure illustrating the speaker 200 mounted in a headrest frame. FIG. 3 is a rear view of FIG. 2. FIG. 4 is a front view of a foam pad 300 mounted to a headrest frame 100 of the headrest having the speaker 200 according to an embodiment of the present disclosure. FIG. 5 is a front view of a slab pad 400 mounted to the foam pad 300 of the headrest having the speaker according to an embodiment of the present disclosure. FIG. 6 is a sectional view taken along line A-A of FIG. 5. FIG. 7 is a view illustrating a covering 500 of the headrest having the speaker according to an embodiment of the present disclosure.

With reference to FIGS. 1-7, an embodiment of the headrest having the speaker 200 according to the present disclosure is described.

The headrest having the speaker 200 according to the present disclosure includes the headrest frame 100 having a rear surface to which a driving module 600 is coupled so that the headrest frame 100 is movable forwards, rearwards, or vertically in response to the operation of the driving module 600. The headrest frame 100 has a front surface formed with a mounting space 110 recessed rearwards. The headrest includes the speaker 200, inserted and fastened into the mounting space 110 in the headrest frame 100, provided with an output portion 210 facing forwards and configured to output sound, and having a rear side closed by the headrest frame 100. The headrest also includes the foam pad 300 mounted on the front surface of the headrest frame 100 so as to cover both the headrest frame 100 and the speaker 200, and having formed therein a first through hole 310 configured to output sound forwards at a position corresponding to the output portion 210. The headrest further includes the covering 500 configured to cover the front surface of the foam pad 300 and forming the front exterior of the headrest.

As illustrated in FIGS. 1 and 2, the headrest frame 100 may be provided, at the front side thereof, with the mounting space 110 recessed rearwards (i.e., inwards or toward the rear of the headrest), where the mounting space 110 may have mounted therein the speaker 200 provided with the output portion 210 configured to output sound forwards (i.e., outward or toward the front of the headrest).

The speaker 200 may be inserted into the mounting space 110 in the headrest frame 100 so as to be integrally coupled with the headrest frame 100 by bolting, for example. The headrest frame 100 may be formed of a plastic material such as synthetic resin, and may have formed therein the mounting space 110 corresponding to the volume of the speaker 200.

In addition, the headrest frame 100 may have a rear side, at which a driving device configured to move the headrest frame 100 is disposed. Since the headrest frame 100 has formed therein the mounting space 110 in the front side thereof and is provided with the driving device disposed at the rear side thereof, the volume of the headrest may be minimized.

In order to support the head of a passenger, the foam pad 300 may be provided and may be coupled to the front side of the headrest frame 100 so as to surround the front side of the headrest frame 100 and the speaker 200.

The foam pad 300 may be formed to have a predetermined thickness so as to support the head of a passenger when a traffic accident occurs. The foam pad 300 may be manufactured to have a sufficient thickness so that the head of the passenger does not collide with the speaker 200.

In addition, the foam pad 300 may be formed with the first through hole 310 having a size corresponding to the output portion 210 configured to output sound generated from the speaker 200. The sound output from the output portion 210 may be delivered to the passenger through the first through hole 310, and the first through hole 310 may serve as a resonator of the speaker 200.

Accordingly, the head of the passenger may be sufficiently protected when an accident occurs when the speaker 200 is mounted inside the headrest.

In addition, since the speaker 200 is mounted in the headrest and the sound from the speaker 200 is output forwards, the sound may be transmitted only to a driver and may be prevented from being transmitted towards a rear-seat passenger, thereby improving the marketability of the vehicle. In addition, by delivering the sound only to the driver, driving safety may be improved.

After the foam pad 300 is coupled to the headrest frame 100, the covering 500 is coupled to the foam pad 300 so as to cover the outer surface of the same, thereby improving the appearance of the headrest.

The foam pad 300 may be formed, at the front side thereof, with an indent 320 indented inwards (i.e., rearwards or toward the rear of the headrest). The headrest may further include a slab pad 400, seated in the indent 320 of the foam pad 300 so as to be coupled to the foam pad 300. The slab pad 400 may have formed therein a plurality of second through holes 410, arranged radially at the position corresponding to the first through hole 310, each of the second through holes 410 having a smaller diameter than the first through hole 310.

As illustrated in FIGS. 1, 4, and 5, the foam pad 300 may be formed, at the front side thereof, with the indent 320 indented inwards, and the slab pad 400 may be seated in the indent 320 so as to be coupled to the foam pad 300.

With this structure, the rear side of the passenger's head may be doubly supported in the event of a vehicle accident.

In addition, the slab pad 400 may have formed therein a plurality of second through holes 410, covering the first through hole 310 formed in the foam pad 300, arranged radially, and having a smaller diameter than the first through hole 310 at the position corresponding to the first through hole 310.

With this structure, the sound generated from the speaker 200 may pass through the first through hole 310 and the second through holes 410 so as to be delivered to the driver.

The covering 500 may have a front side formed with cover holes 510, each having a smaller diameter than the second through holes 410 and arranged in a predetermined pattern including a gradation pattern or a radial pattern.

As illustrated in FIG. 7, after the foam pad 300 is coupled to the headrest frame 100, the covering 500 is coupled to the foam pad 300 so as to cover the outer side of the same, thereby improving the marketability of the headrest. The covering may have a front side provided with a plurality of cover holes 510 formed therethrough, each of which has a smaller diameter than the second through holes 410. The cover holes 510 may be arranged in a gradation pattern or a radial pattern. The sound output from the speaker 200 may be delivered to the driver through the first through hole 310, the second through holes 410, and the cover holes 510.

The mounting space 110 may be recessed further rearwards than the speaker 200 so as to serve as a sound box for the speaker 200.

When the speaker 200 is inserted into the mounting space 110 recessed from the front to the rear of the headrest frame 100, the outer surface of the speaker 200 and the outer surface of the headrest frame 100 may be continuously formed. The mounting space 110 may be indented inwards and may be formed to be greater than the volume of the speaker 200 so as to form a free space at the rear of the speaker 200.

As illustrated in FIG. 6, the free space may be formed at the rear of the output portion 210 of the speaker 200 so as to serve as a resonator for the speaker 200, thereby delivering a richer sound to the driver.

The headrest may further include a sound absorption pad 120 acting as a shield between the speaker 200 and the headrest frame 100 so as to prevent sound leakage.

As illustrated in FIG. 6, when the speaker 200 is inserted into the mounting space 110 in the headrest frame 100, the sound absorption pad 120 is disposed between the speaker 200 and the headrest frame 100, which are in contact therewith, thereby preventing transmission of the sound output from the speaker 200 to the rear of the headrest frame 100 and causing the sound to be output forwards.

Accordingly, the sound absorption pad 120 may block transmission of the sound from the speaker 200 to the rear-seat passenger.

The output portion 210 of the speaker 200 may be provided as a pair of output portions 210 spaced apart in the leftward-and-rightward direction in the headrest frame 100. Similarly, the first through hole 310 may be provided as a pair of first through holes 310 so as to correspond to the pair of output portions 210.

Since the output portion 210 is provided as a pair spaced apart at opposite sides of the headrest frame 100, each one corresponding to an ear of the driver, stereo sound may be output, thereby improving the marketability of the vehicle.

In addition, the output portions 210 at opposite sides output sound to corresponding ears of the driver and deliver accurate sound to the driver, thereby preventing confusion of the driver and improving driving safety.

The output portions 210 provided to be spaced apart from each other in the leftward-and-rightward direction may be integrated in the speaker 200, and the speaker 200 may be mounted in the headrest frame 100 in the form extending in vertical and horizontal directions.

As illustrated in FIG. 2, the output portion 210 provided as a pair is manufactured in the form of a module integrated in the main body of the speaker 200. The main body of the speaker 200 may have a circuit board that is connected to the output portion 210 and transmits a signal so that a sound is output from the output portion 210 integrally connected thereto.

Accordingly, the output portion 210 and the main body of the speaker 200 are integrally modularized and directly coupled to the headrest frame 100 in the manufacturing process, thereby simplifying the coupling process.

In addition, the speaker 200 may be coupled to the headrest frame 100 by bolting in the vertical and leftward-and-rightward directions. Bolting is one embodiment of a method of coupling the speaker 200 to the headrest frame 100. The speaker 200 may also be coupled to the headrest frame 100 using any of various other coupling methods.

By the method of bolting, the speaker 200 may be firmly coupled to the headrest frame 100 and may be prevented from becoming separated from the same even upon application of an external shock or vibration from the vehicle.

The speaker 200 may be provided with a speaker connector 220, penetrating the headrest frame 100 and extending rearwards so as to allow electrical signals and power to be applied thereto.

As illustrated in FIG. 3, the speaker 200 may be provided with the speaker connector 220, which extends rearwards and to which electrical signals and power are applied. In other words, electrical signals and power are supplied to the speaker 200 via the speaker connector 220. The speaker connector 220 may penetrate a mounting hole 130 formed in the headrest frame 100 and may extend rearwards so as to be electrically connected to the outside (i.e., allow electrical connection to the speaker 200 from outside the headrest frame 100).

Since the speaker connector 220 penetrates the mounting hole 130 in the headrest frame 100 and extends rearwards, the speaker connector 220 may guide assembly of the speaker 200 into the mounting space 110.

In addition, since the speaker 200 has the output portion 210 formed as a pair and positioned at opposite sides and has the speaker connector 220 extending from the center of the speaker 200 to the rear so as to be connected to the output portion 210 via the circuit board, the volume of the speaker 200 may be minimized.

The speaker 200 may be mounted in the lower portion of the headrest frame 100 and may have the output portions 210 positioned in the lower front portion of the headrest frame 100.

The headrest frame 100 may be provided, at the lower portion thereof, with the mounting space 110. The speaker 200 configured to output sound may be mounted in the mounting space 110.

Accordingly, sound may be output downwards from the headrest, which is located behind the driver's head, and the position of the speaker 200 may correspond to the position of the driver's ears. Therefore, even relatively quiet sounds may be effectively transmitted to the driver, and transmission of sound to the rear-seat passengers may be minimized, thereby improving the marketability of the vehicle.

The headrest may further include a headrest stay 700 configured to connect the headrest frame 100 to a seat. The driving module 600 may interconnect the headrest frame 100 with the headrest stay 700 so as to move the headrest forwards, rearwards, or vertically.

As illustrated in FIG. 1, the headrest stay 700 may be coupled to the rear side of the headrest frame 100 so as to connect the headrest frame 100 to the seat.

In addition, the headrest frame 100 may be connected to the headrest stay 700 via the driving module 600, and the headrest frame 100 may be moved forwards, rearwards, or vertically in the headrest stay 700 according to the operation of the driving module 600.

The headrest may further include a headrest connector 710 having a terminal 720 coupled into (e.g., inside) the headrest connector 710. The terminal 720 is connected to an electric wire inserted into the headrest stay 700. In this way, the electric wire is coupled to the end of the headrest stay 700 via the terminal 720 so as to be connected to the outside (i.e., connectable to something outside the headrest and headrest stay 700).

Figure 8:
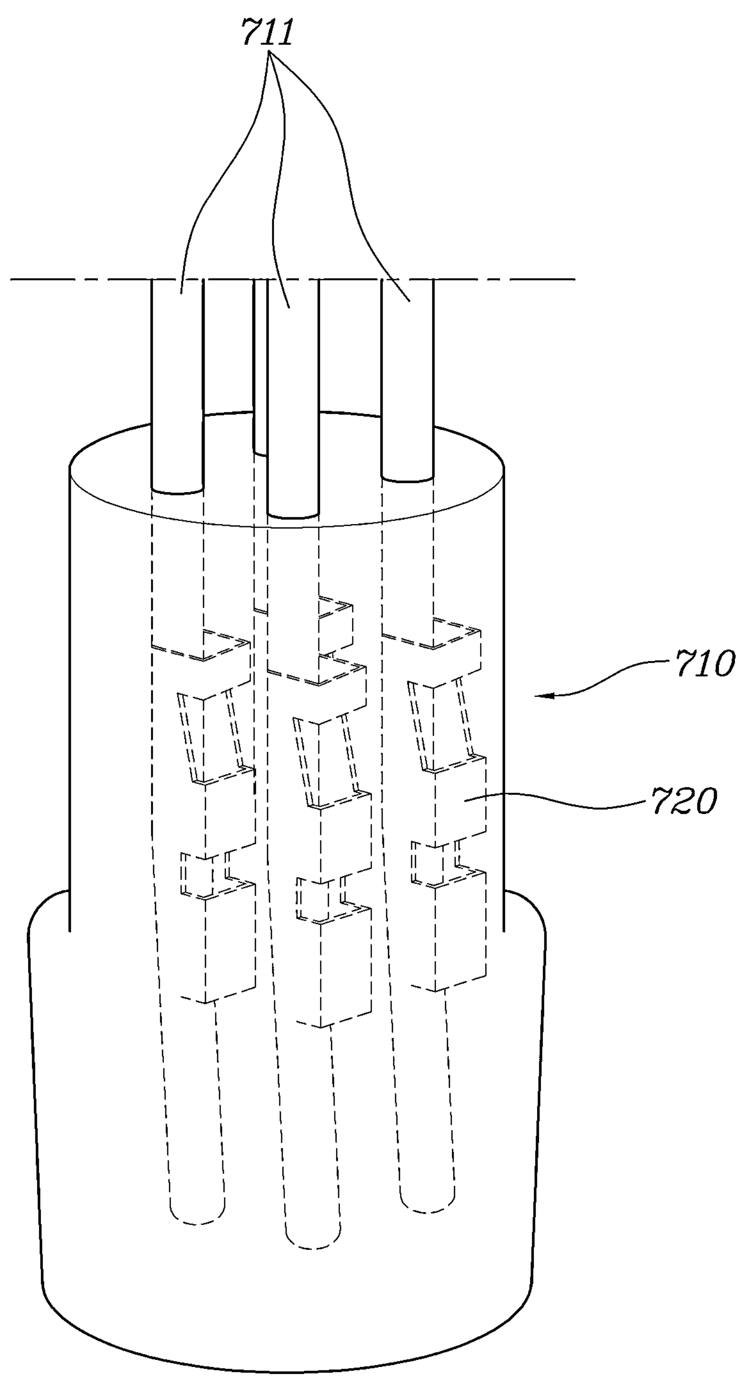
FIG. 8 is a view illustrating a headrest connector of a headrest having a speaker according to an embodiment of the present disclosure.

FIG. 8 is a view illustrating the headrest connector 710 of the headrest having the speaker according to an embodiment of the present disclosure.

Referring further to FIG. 8, the headrest connector 710 capable of being connected to the outside may be coupled to the end of the headrest stay 700. In addition, the headrest connector 710 may be provided with an electric wire 711, which is inserted into the headrest stay 700 so as to transmit an electrical control signal to the driving module 600 and to the speaker 200. The end of the electric wire 711 may be coupled to the terminal 720 so as to be coupled to the headrest connector 710.

Accordingly, an external electrical control signal may be transmitted to the driving module 600 via the headrest connector 710, and power may be applied to the driving module 600 and the speaker 200 so as to operate the same.

In addition, since the electric wire 711 is inserted into the headrest stay 700 and the headrest connector 710 is coupled to the end of the headrest stay 700, the electric wire 711 is not exposed to the outside, thereby improving the marketability of the headrest.

The headrest may further include a headrest cover 800, which is coupled to the rear side of the headrest frame 100 so as to enclose the driving module 600 and is configured to block rearward output of sound from the speaker.

The driving module 600 and the headrest stay 700, which are coupled to the rear side of the headrest frame 100, may be covered by the headrest cover 800. In this example, the headrest cover 800 is coupled to the headrest frame 100 from the rear side, thereby improving the marketability of the vehicle.

In addition, a handle, a hanger, or a display device (not shown) for rear-seat passengers may be provided at the rear side of the headrest cover 800.

In addition, since the headrest cover 800 is coupled to the rear side of the headrest frame 100, it may be possible to prevent transmission of the sound from the speaker 200 to the rear of the headrest frame 100.

As is apparent from the above description, the present disclosure provides a headrest having a speaker configured such that the speaker is embedded in the front portion of a headrest frame. A driving module is provided at the rear side of the headrest frame, and a foam pad and a slab pad are coupled in front of the speaker, making it possible to prevent a collision between the speaker and the head of a passenger even in the event of a traffic accident.

In addition, sound from the speaker embedded in the front portion of the headrest frame may be accurately delivered to the driver through a first through hole formed in the foam pad, a second through hole formed in the slab pad, and a cover hole formed in a covering.

In addition, since the speaker is mounted in the headrest and the sound is output forwards (i.e., toward the front of the headrest and the driver), the sound may be transmitted only to the driver, and transmission thereof towards a rear-seat passenger may be blocked, thereby improving the marketability of the vehicle. In addition, by transmitting the sound only to the driver, driving safety may be improved.

Although embodiments of the present disclosure have been disclosed for illustrative purposes, those having ordinary skill in the art will appreciate that various modifications, additions and substitutions are possible without departing from the scope and spirit of the inventive concept as disclosed in the accompanying claims.

What is claimed is:

1. A headrest having a speaker, the headrest comprising:

a headrest frame having a rear surface to which a driving module is coupled so that the headrest frame is movable forwards, rearwards, or vertically in response to operation of the driving module, the headrest frame having a front surface formed with a speaker mounting space recessed rearwards;

a speaker, inserted and fastened into the speaker mounting space in the headrest frame, provided with an output portion facing forwards and configured to output sound, the speaker having a rear side closed by the front surface of the headrest frame;

a foam pad mounted on the front surface of the headrest frame so as to cover both the headrest frame and the speaker, the foam pad having formed therein a first through hole configured to output sound forwards at a position corresponding to the output portion;

a covering configured to cover a front surface of the foam pad and forming a front exterior of the headrest; and a headrest stay configured to connect the headrest frame to a seat, wherein the speaker mounting space is provided as a pair of speaker mounting spaces spaced apart in a leftward-and-rightward direction in the headrest frame, and is recessed further rearwards than the speaker so as to serve as a sound box of the speaker, wherein the driving module is provided in a driving module mounting space formed in a rear surface of the headrest frame between the pair of speaker mounting spaces, and interconnects the headrest frame with the headrest stay so as to move the headrest forwards, rearwards, or vertically.

2. The headrest according to claim 1, wherein: the foam pad has a front side formed with an indent indented inwards, and the headrest further comprises a slab pad seated in the indent of the foam pad so as to be coupled to the foam pad, the slab pad having formed therein a plurality of second through holes arranged radially at a position corresponding to the first through hole, wherein each second through hole has a smaller diameter than the first through hole.

3. The headrest according to claim 2, wherein the covering has a front side formed with cover holes, each having a smaller diameter than the second through holes and arranged in a predetermined pattern including a gradation pattern or a radial pattern.

4. The headrest according to claim 1, further comprising a sound absorption pad acting as a shield between the speaker and the headrest frame so as to prevent sound leakage.

5. The headrest according to claim 1, wherein the output portion of the speaker is provided as a pair of output portions spaced apart in a leftward-and-rightward direction in the headrest frame, and the first through hole is provided as a pair of first through holes so as to correspond to the pair of output portions.

6. The headrest according to claim 5, wherein the pair of output portions is integrated in the speaker, and the speaker is mounted in the headrest frame in a form extending in vertical and horizontal directions.

7. The headrest according to claim 1, wherein the speaker is provided with a speaker connector penetrating the headrest frame and extending rearwards so as to allow electrical signals and power to be applied thereto.

8. The headrest according to claim 1, wherein the speaker is mounted in a lower portion of the headrest frame and has the output portion positioned in a lower front portion of the headrest frame.

9. The headrest according to claim 1, further comprising a headrest connector having a terminal, the terminal being coupled into the headrest connector and connected to an electric wire inserted into the headrest stay, such that the electric wire is coupled to an end of the headrest stay via the terminal so as to be connectable from outside the headrest stay.

10. The headrest according to claim 1, further comprising a headrest cover coupled to a rear surface of the headrest frame so as to enclose the driving module and configured to block rearward output of sound from the speaker.

11. The headrest according to claim 1, wherein the front surface of the headrest frame is spaced apart from the rear side of the speaker to form a free space at the rear of the speaker.

12. The headrest according to claim 11, wherein the free space is configured to serve as a resonator for the speaker.

* * * * *